Jan. 23, 1940.   H. E. METCALF   2,188,058

VEHICLE SIGNALING SYSTEM

Filed March 19, 1938   2 Sheets-Sheet 1

STEERING GEAR SWITCH

STEERING GEAR SWITCH

INVENTOR,
HERBERT E. METCALF.
BY Lippincott & Metcalf
ATTORNEYS.

Jan. 23, 1940.  H. E. METCALF  2,188,058
VEHICLE SIGNALING SYSTEM
Filed March 19, 1938   2 Sheets-Sheet 2

STEERING GEAR SWITCH

STEERING GEAR SWITCH

INVENTOR,
HERBERT E. METCALF.
BY
Lippincott & Metcalf
ATTORNEYS.

Patented Jan. 23, 1940

2,188,058

UNITED STATES PATENT OFFICE 2,188,058

VEHICLE SIGNALING SYSTEM

Herbert E. Metcalf, Walnut Creek, Calif., assignor, by mesne assignments, to Signacator Systems, Inc., Oakland, Calif., a corporation of California Application March 19, 1938, Serial No. 196,814

3 Claims. (Cl. 177—339)

My invention relates to vehicle signaling systems and more particularly to such a system having hand and automatic switches operating in parallel to energize right and left indicators from a power source.

Among the objects of my invention are: to provide a combined hand and automatic switch signaling system wherein only one indicating lamp can be illuminated at the same time, irrespective of switch positions; to provide, in a combination of hand and automatic switches utilized for vehicle signaling, a hand switch over-riding the condition of the automatic switch; and to provide a simple and efficient over-riding hand switch in a vehicle signaling system.

This application is a continuation in part of my prior application, Serial No. 170,611, filed October 23, 1937, entitled Vehicle signaling system with manual over-ride, since matured into United States Patent No. 2,126,940, dated August 16, 1938, and utilizes the same broad idea disclosed therein but with different apparatus.

Other objects of my invention will be apparent or will be specifically pointed out in the description forming a part of this specification, but I do not limit myself to the embodiment of the invention herein described, as various forms may be adopted within the scope of the claims.

In my above referred to application I have pointed out the fact that in electric vehicle signaling systems wherein an automatic switch is attached to the steering gear of a vehicle to indicate right and left turns, and wherein a hand switch is utilized to indicate the same turns, it is possible for both indicating circuits to be energized at the same time, at least for an instant, when one of the switches is energizing, for example, the right hand circuit, and the other switch is energizing the left hand circuit.

In that prior application I have described and claimed a particular type of hand switch wherein a resistor is substituted for the visual indicator not energized so that, even if the automatic switch should turn to energizing position of that particular circuit, the current will pass through the resistor and not through the indicator. Thus at all times, when the hand switch is utilized, only the indicator selected by the hand switch can ever be illuminated.

I also pointed out in that above-identified application that it was desirable to substitute this resistor for the visual indicator, because current through the automatic switch is utilized in that type of system to release the hand switch from its energizing position, irrespective of which circuit the automatic switch energizes.

The present application differs from the prior filed application only in that in the present application I do not substitute for the visual indicator not selected by the hand switch a resistor as such, but arrange contacts on the hand switch so that, when the hand switch is operated to right or to left, auxiliary connections are made so that whichever way the automatic switch turns it will energize the indicators on one side only, namely, that side selected by the hand switch. In other words, in the present application I am using in place of the resistor, the indicators already energized by the hand switch.

My invention may be more fully understood by direct reference to the drawings.

Figure 1:
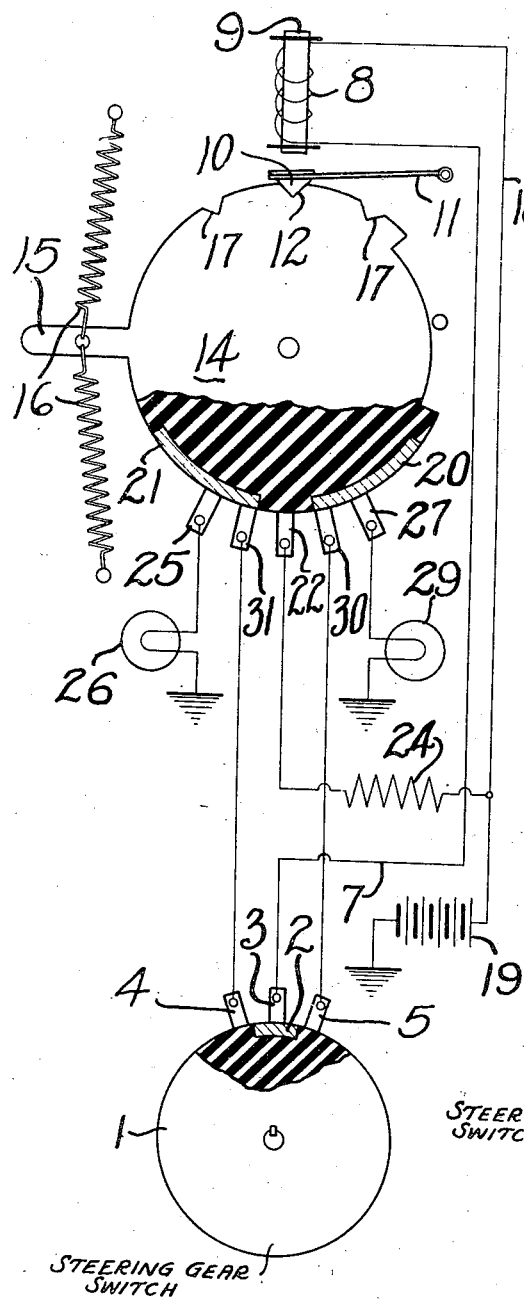
Figure 1 is a schematic and diagrammatic representation of a vehicle signaling system wherein the hand and automatic switches are in neutral position.

Referring to Figure 1, the automatic switch comprises disc 1 directly driven from the steering mechanism of the vehicle and attached thereto in any convenient manner. I have not shown any means by which to attach this switch to the steering mechanism as this portion of the system is no part of the present invention. Automatic disc 1 is preferably made of insulating material and carries a conductive segment 2. An automatic common brush 3 is positioned in constant contact with segment 2, and automatic lateral brushes 4 and 5 are positioned around the periphery of automatic disc 1 out of contact with segment 2 and on each side thereof when the vehicle is proceeding in the straight ahead path. As the steering gear is turned over a predetermined angle, segment 2 will connect with common brush 3 to lateral brush 4 or 5 in accordance with the direction of the vehicle turn. Common brush 3 of the automatic switch leads through common brush line 7 to a releasing solenoid 8 wound around release core 9, placed in magnetic relationship to a magnetic pawl 10 mounted on a spring 11 cooperation with central notch 12 of a hand switch disc 14. Under normal circumstances pawl 10 will remain in central notch 12, centering the disc.

Hand switch disc 14 is provided with an operating handle 15, to which balanced return springs 16 are attached. Hand switch disc 14 is also provided with lateral notches 17, into which pawl 10 will drop as disc 14 is rotated to right or left, thus holding the hand disc in right or left position as the case may be.

The circuit through solenoid 8 is completed through source wire 18 to source 19, the other end of which is grounded as is customary in automotive vehicles.

In practical installations the ignition switch may be placed in series with a source 19, so that the signaling system is inoperative whenever the ignition is turned off and operative only when the ignition is on.

Hand switch disc 14 carries a pair of spaced lateral conductive segments 20 and 21, and when disc 14 is in the central position as determined by spring 16 and pawl 10 registering with notch 12, a hand switch common brush 22 is positioned between spaced segments 20 and 21 so that it does not make contact with either. Common brush 22 is connected through balancing resistor 24 to source 19.

Segment 21 has bearing thereon a left hand indicator brush 25 connected to left hand indicator lamp 26, which is then grounded. Likewise, right segment 20 is provided with a right indicator brush 27 which is connected to right indicator lamp 29, which is then grounded.

Contacting the ends of segments 20 and 21, adjacent hand switch common brush 22, are right and left automatic switch brushes 30 and 31, connected respectively to automatic lateral brushes on automatic switch disc 1 by intermediate circuit wires.

Thus it will be seen that all connections made by the automatic switch are subject to the position of the hand switch.

Figure 2:
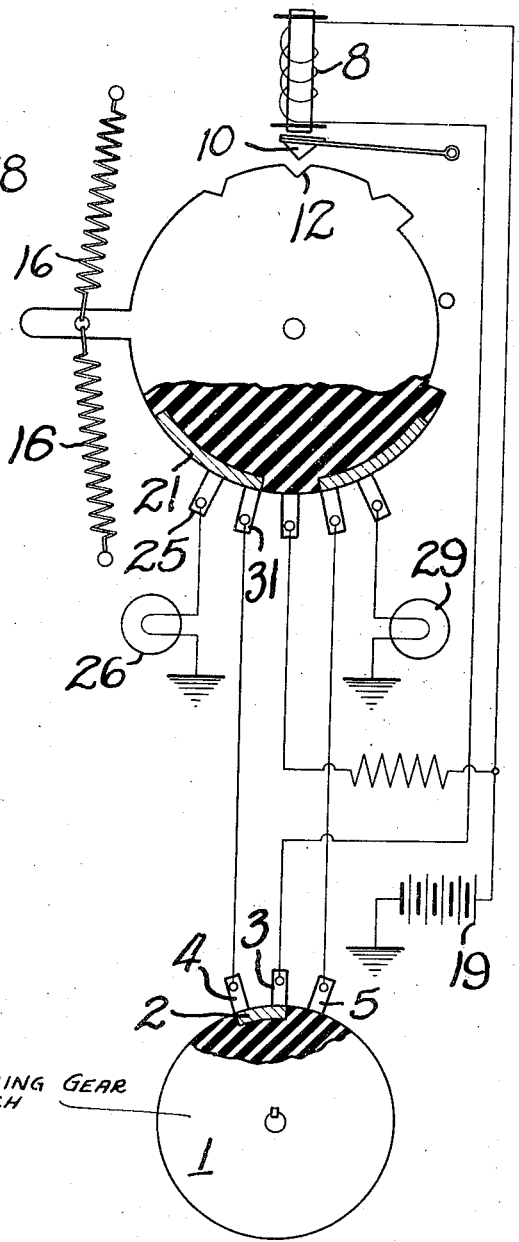
Figure 2 is a similar diagram showing a left hand circuit energized by the automatic switch alone.
Figure 3:
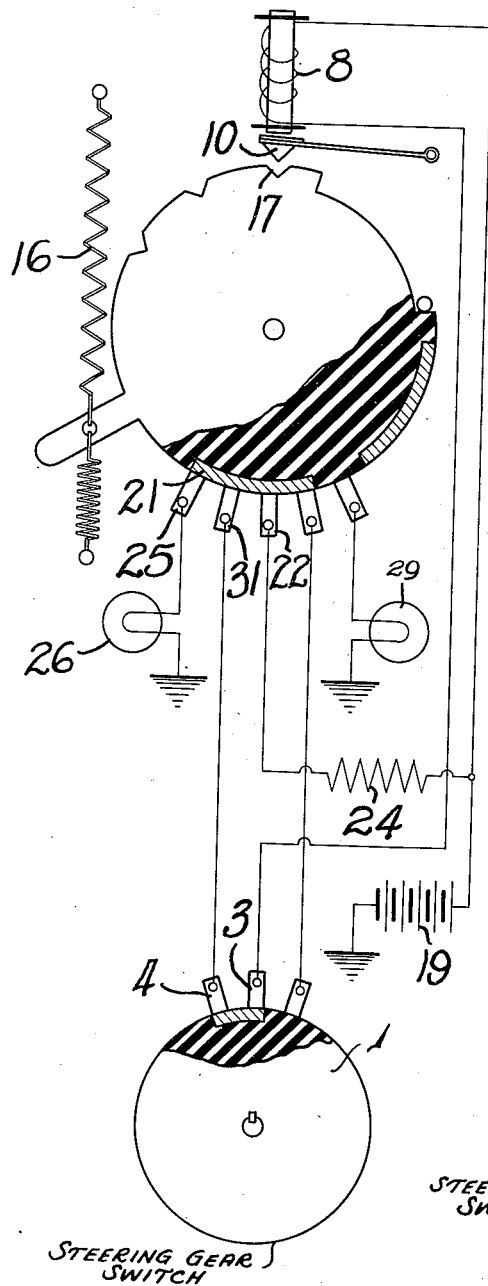
Figure 3 is a similar diagram showing the left hand circuit energized by both switches.
Figure 4:
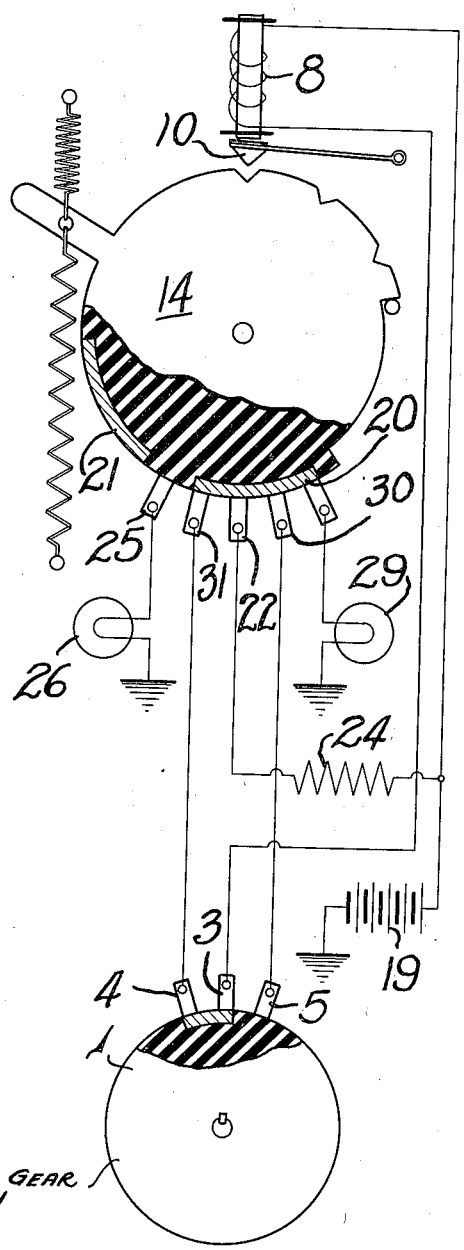
Figure 4 is a similar diagram showing the automatic switch in a position to energize the left hand circuit and the hand switch in a position to energize the right hand circuit.

In order to more fully explain the operation of the device, I have shown three conditions in Figures 2, 3 and 4. In Figure 2 the hand switch is in central position. The vehicle has made a turn to the left and consequently the automatic switch segment 2 is connecting automatic switch brushes 3 and 4. A circuit is, therefore, provided through the left indicator lamp 26 as follows: Beginning with source 19 current will flow through solenoid 8 to common automatic brush 3, thence to lateral brush 4, and thence to brush 31 on the hand switch, through lateral segment 21 on the hand switch into indicator brush 25, and thence through lamp 26. Under these conditions pawl 10 will be pulled out of notch 12 but no change will occur in the hand switch, because the hand switch is already neutralized and springs 16 are centering this disc.

A similar circuit can be traced through the right hand indicator lamp when the automatic switch is turned to the right. Thus, with no operation of the hand switch, indicators 26 and 29 will faithfully show the turning of the vehicle.

In Figure 3 the hand switch has been moved to energize the left hand lamp 26 from source 19 through the following circuit: namely, through balancing resistor 24 to hand switch common brush 22, through lateral segment 21 and from thence through lamp 26 via brush 25. If this setting of the hand switch has been made before a turn is made and before the automatic switch has completed any circuits, pawl 10 will be in notch 17 and will hold the hand switch disc in position to energize lamp 26 until some circuit is made through the automatic switch.

In Figure 3, I have shown the automatic switch completing a circuit to left lamp 26, thus supposing that a turn has been made in the same direction as that preset and preindicated by the hand switch. Under these circumstances current will flow in two circuits to lamp 26, one the circuit already described for the hand switch, and the other through the automatic switch as follows: From source 19 through solenoid 8 to common brush 3 on the automatic switch, thence to lateral brush 4, thence to automatic brush 31 on the hand switch, and thence through segment 21 to left lamp 26. The two circuits energizing lamp 26 are in parallel and I utilize balancing resistor 24 to cause current to flow through solenoid 8. As current flows through solenoid 8 pawl 10 will be lifted out of notch 17 and the hand switch disc will be centralized by the extended spring 16.

The drawing in Figure 3 shows the hand switch at the instant of release and before it is moved to central position. After it is moved back to central position, however, lamp 26 will remain illuminated, due to the closed circuit through the automatic switch. Figure 3, therefore, represents the condition which will occur when the hand switch is preset to make a left hand turn and the left hand turn is actually made. The hand switch will release, due to the use of the balancing resistor 24, and the hand switch will return to neutral without disturbing the illumination of indicator 26.

One other condition may arise, namely, the hand switch may be set to make, for example, a right hand turn. The operator may then, without bothering to change the setting of the hand switch, make a left hand turn, and it is this condition which normally would light both lamps. Both lamps, however, cannot be illuminated with the present switches, and Figure 4 shows this condition.

In Figure 4 the hand switch disc 14 has been preset to illuminate right hand lamp 29. The turn, however, was actually made to the left, so that the automatic switch is connecting central brush 3 to lateral brush 4. Under these circumstances segment 21 is not in contact with any hand switch brush and left hand lamp 26 is completely isolated so that it cannot be illuminated under any circumstances. It is necessary, however, under this condition, that current flow through solenoid 8 so that hand switch disc 14 may be released, and this is accomplished because both lateral brushes 4 and 5 of the automatic switch are connected to automatic switch brushes 30 and 31 on the hand switch; and when the hand switch is in this position, both of these brushes are in contact with hand switch segment 20. Thus current will flow through solenoid 8 as follows: Beginning with source 19, through solenoid 8 to central brush 3 in automatic switch, thence to brush 4 in automatic switch to brush 31 on the hand switch, through segment 20 in hand switch and through lamp 29. Lamp 29, of course, is being simultaneously energized through balancing resistor 24, the circuits being in parallel, and by the use of the balancing resistor sufficient current to release pawl 10 will flow through solenoid 8. Pawl 10 will then be retracted and the hand switch 14 will return to central position. As it returns to central position, however, segment 21 swings across automatic switch brush 31 and indicator brush 25, thus illuminating left hand lamp 26. Right hand lamp 29 will be cut out, because common brush 22 of the hand switch is isolated.

Thus, when the turn to the left is actually made, left connection of the automatic switch releases the hand disc 14, and as hand disc 14 returns to central position, the energization is shifted from lamp 29 erroneously connected up by the operator, and current is switched to lamp 26 indicating the turn actually made. Thus, with the connections in the circuit as shown, the automatic switch will release the hand switch, irrespective of which indicator is being energized by the hand switch, and will set up, after release of the hand switch, the proper indication of the turn actually being made. Whenever the hand switch is thrown to right or left, the opposite lamp is always isolated. Thus it is impossible under any circumstances to illuminate both lamps at once.

I claim:

1. In combination, a vehicle signaling system comprising a steering gear switch automatically and selectively energizing a pair of intermediate circuits from a power source upon movement of said steering gear, a hand switch movable at will of the operator to selectively energize a pair of indicator circuits each including an indicating device, means for holding said hand switch in energizing positions, means actuated by current passing through said steering gear switch for releasing the hold of said holding means, a pair of spaced segmental contacts movable by motion of said hand switch, a power brush connected to said power source positioned between said contacts when said switch is in central position and connected to a segment when said hand switch is moved to right or left, a pair of indicator brushes in contact one with each segment and to an indicator when said hand switch is in central position, a pair of intermediate brushes in contact one with each segment at a point between said indicator brushes and said power brush when said hand switch is at central position, said intermediate brushes being connected one to each intermediate circuit energized by said steering gear switches, said brushes being spaced relative to each other to completely disconnect one indicator circuit and to connect the other indicator circuit to both intermediate circuits and to said power source when said hand switch is moved to either left or right position.

2. In combination, a vehicle signaling system comprising a pair of indicator circuits each including a signal device, a steering gear switch automatically and selectively connecting a pair of intermediate circuits to a power source in accordance with a turning movement of the steering gear of a vehicle, a hand switch selectively movable to two positions at the will of the vehicle operator, resilient means for centralizing said hand switch between said two positions, means for holding said hand switch in the selected position, contact means on said hand switch for separately connecting said intermediate circuits to said indicator circuits when said hand switch is in central position and for connecting both of said intermediate circuits to said power source and to an indicator circuit selected by movement of said hand switch to one of the two positions, and means operated by current passing through said automatic switch only for releasing the hold of said holding means whereby said hand switch returns to neutral position.

3. In combination, a vehicle signaling system comprising a power source, a pair of signaling circuits each including a signal device, an automatic switch member moved by turning of the vehicle steering gear, a central brush on said automatic switch connected to said power source, lateral brushes on each side of said central brush, each lateral brush being connected to an intermediate circuit, a conductive member on said switch member bridging said central brush to a lateral brush in accordance with the turn made by said vehicle, a hand switch member movable by the vehicle operator to two positions, resilient means for centering said hand switch member between said two positions, a power brush bearing against said hand switch member and connected to said power source, intermediate circuit brushes on each side of said power brush and connected each to an intermediate circuit, an indicator brush outwardly spaced from each intermediate brush and each connected to an indicator circuit, a pair of spaced conducting segments on said hand switch member connecting one indicator brush to one intermediate brush on each side when said hand switch member is in central position, and connecting said power brush with both intermediate brushes and one only indicator brush when moved to either of the selectable positions of said hand switch member, means for holding said hand switch member in the position selected by the operator of the vehicle, and means operated by current passing through said automatic switch only for releasing the hold of said holding means, whereby said hand switch returns to neutral position.

HERBERT E. METCALF.